(No Model.)

B. CLARK.
THROTTLE VALVE.

No. 519,665. Patented May 8, 1894.

Witnesses:
Edwin Cruse.
Alex. Scott

Inventor:
Bernard Clark,
by Howard
attys

UNITED STATES PATENT OFFICE.

BERNARD CLARK, OF SUSQUEHANNA, PENNSYLVANIA.

THROTTLE-VALVE.

SPECIFICATION forming part of Letters Patent No. 519,665, dated May 8, 1894.

Application filed March 30, 1893. Serial No. 468,382. (No model.)

*To all whom it may concern:*

Be it known that I, BERNARD CLARK, of Susquehanna, in the county of Susquehanna and State of Pennsylvania, have invented certain new and useful Improvements in Throttle-Valves, of which the following is a specification, reference being had to the accompanying drawings, and to the letters of reference marked thereon.

The object of my invention is to enable the throttle stuffing-box to be packed without drawing the fire and cutting off steam from the engine. I accomplish this end by placing the valve-operating lever, or other equivalent device, within the throttle stand-pipe, by which arrangement the steam cannot pass through the tubular connection through which the valve-operating rod leading to the cab passes; it being seen that the gland of the stuffing-box may be removed, and the stuffing-box packed, without the issue of steam into the cab.

Figure 1:
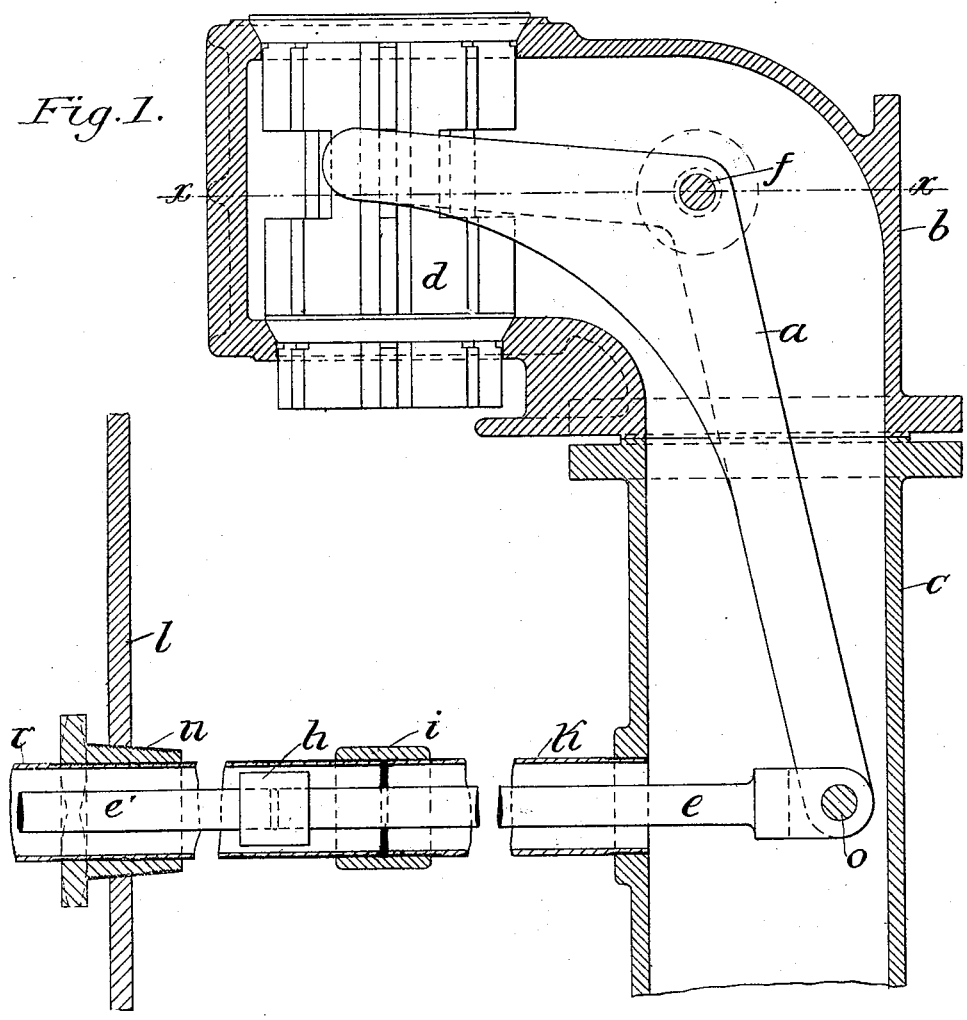
Figure 2:
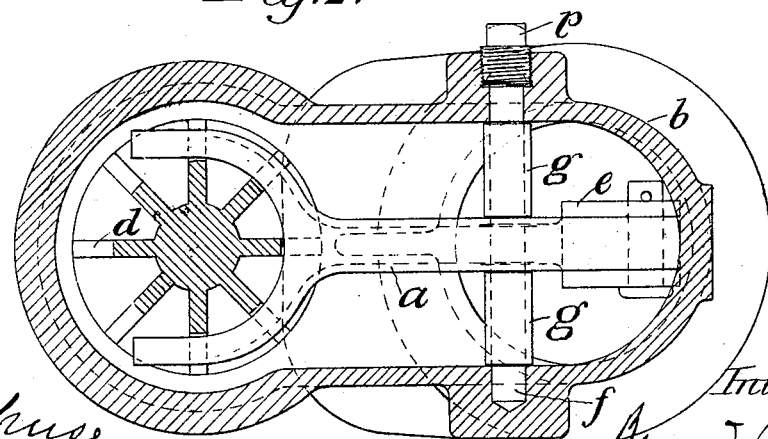

In the accompanying drawings, Figure 1 is an elevation, chiefly in section, showing my invention. Fig. 2 is a sectional plan on the line x—x of Fig. 1.

Similar letters of reference indicate similar parts in the respective figures.

The throttle stand-pipe is made in two flanged sections, C and b, secured together at a steam-tight joint by bolts and nuts. A bell-crank a placed within the stand-pipe, has its fulcrum on a bolt or pin f, provided with bearings in the upper section b of the stand-pipe. The bolt or pin f is furnished with sleeves or bushings g, one on either side of the bell-crank, which serve to maintain it in a position central of the stand-pipe, the opening through which the bolt or rod f is inserted, being closed by a screw plug p.

The valve proper is represented by d, it being seated in the upper section b of the stand-pipe. The wings of the valve d are indented to receive the U-shaped outer end of the upper or short arm of the bell-crank a, as seen more particularly in Fig. 2, by which construction the valve is held and adapted to be operated in the ordinary manner by the oscillation of the bell-crank. The rod, by means of which the bell-crank a is operated from the cab, is represented by e, it being attached to the lower or long arm of the bell-crank by means of a pin o.

The tubular connections between the stand-pipe, the wall l of the steam dome and the front plate of the boiler, are represented by k and r; and through these tubular connections the rod e and its extension e' pass, so that the latter shall reach to, and by attachment to the throttle lever, be operated from, the cab of the engine. The rods e and e' are connected by means of a coupling h; and the pipes k and r are united by the coupling i. The rod e should project somewhat beyond the limit of the pipe k, so as to facilitate the coupling of the rods e and e'. The pipe r is exteriorly threaded some distance back from its outer end so as to receive the coupling i, and be screwed into the tapered gland u, which in turn is exteriorly threaded so as to screw into the plate l of the steam dome; and the pipe k is also exteriorly threaded at its outer end so as to fit into the coupling i.

The connections of the pipe r at the front plate of the boiler are of the ordinary character, and the usual stuffing-box, gland, and packing appliances are employed.

It is seen that the packing of the stuffing-box can be accomplished without the issue of steam into the cab, inasmuch as the pressure of steam upon the throttle-valve proper will keep it to its seat, and prevent the entrance of steam to the stand-pipe, and the passage of steam from it through the tubular connections to the cab.

I do not limit myself to a bell-crank as a means of operating the throttle-valve proper d, as a lever or system of levers, or any other devices operative through the movement of the throttle lever, may be substituted therefor; provided such devices for operating the valve-proper are inclosed by the stand-pipe.

Having described my invention, I claim—

1. A stand-pipe of a throttle-valve and a valve proper seated therein, combined with a bell-crank valve-operating device, inclosed by the stand-pipe, substantially as set forth.

2. A throttle-valve stand-pipe, a valve proper seated therein, and a bell-crank valve-operating device confined within the stand-pipe, combined with a tubular connection reaching from the stand-pipe to the front plate of the boiler and connecting the said bell-crank valve-operating device to the throttle lever, substantially as set forth.

In testimony whereof I hereunto set my hand and seal.

BERNARD CLARK. [L. S.]

Witnesses:
P. L. LOBER,
C. L. PERRINE.